3,161,983
ADJUSTABLE FISHING FLOAT
Eldon E. Stanek, 2009 10th Ave., Belle Plaine, Iowa
Filed Aug. 2, 1962, Ser. No. 214,279
1 Claim. (Cl. 43—44.90)

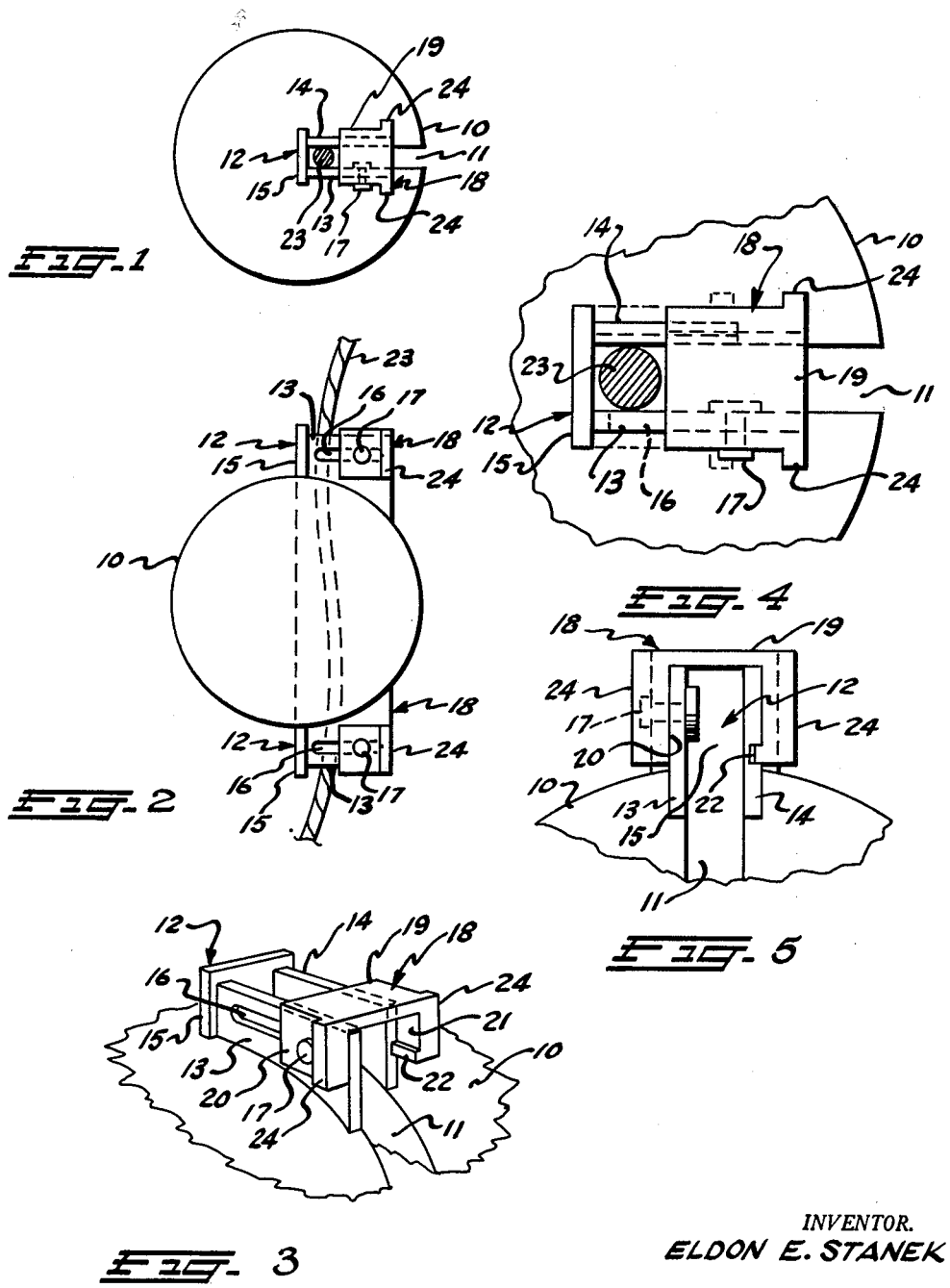

This invention relates to angling which is commonly known as fishing and more particularly to that piece of tackle known as a float.

Fishing floats or bobbers or dobbers as they are sometimes called, depending upon what part of the country one is in, are made in various shapes and size. Some are of the adjustable type, however, none so far have been produced to my knowledge that permits the fishing line not only to pass downward directly through the center of the float, but at the same time be positively adjustable on the line.

It is therefore an object of this invention to provide an adjustable fishing float that not only permits the line to pass vertically through its center, but also to have positive means of adjustment.

Another object of this invention which I personally call an "Adjustable Center Fishing Float" is to provide a float having a minimum number of parts that can be readily manufactured by any company now producing fishing tackle.

Another object of this invention is to provide an adjustable fishing float that does not require the use of any tools for the making of the adjustment on the vertically disposed fishing line.

Another object of this invention is to provide an adjustable fishing float of a design adaptable to any size of float.

Still another object of this invention is to provide an adjustable fishing float of the character described that can readily be manufactured from any solid spherical float now on the market.

Other and further objects and advantages of this Adjustable Fishing Float will be hereinafter described, and the novel features thereof defined in the appended claims.

Referring to the drawing:

FIGURE 1 is a top view of this invention.

FIGURE 2 is a side view of this invention showing a fishing line secured in the same.

FIGURE 3 is a pictorial view of a portion of the top of this invention clearly showing part of the line adjusting mechanism.

FIGURE 4 is an enlarged top view of a portion of this invention clearly showing a part of the line adjusting mechanism.

FIGURE 5 is an enlarged front view of the upper part of this invention clearly showing a part of the line adjusting mechanism.

Similar reference characters refer to similar parts throughout the several views of the drawing.

Having reference now to the drawing in detail, there is generally indicated by the character 10 a typical spherical fishing float having an elongated recess or slot 11 in what is normally one side thereof. A fishing line adjusting mechanism 12 is suitably secured to the top side of the aforesaid spherical fishing float 10 while an alike mechanism is also suitably secured diametrically opposite the aforesaid mechanism 12. This last mechanism is, of course, on the underside of the spherical fishing float 10 as clearly shown in FIGURE 2 of the appended drawings. Both mechanisms are identical in construction and are therefore identified on the appended drawing by identical reference characters. Only one of the mechanisms is of course described in detail in this specification.

The aforesaid fishing line adjusting mechanism 12 embodies side plates 13 and 14 which are located on each side of, and even with the inside surface of the aforesaid elongated recess 11. The side plates are secured by means of an end plate 15 which is, of course, at right angle thereto as best shown in FIGURES 1, 3 and 4 of the appended drawing where it is also seen that the side plate 13 is provided with an horizontally disposed recess 16 for the reception of the pin 17 that assists in holding the U-shaped slide 18 in the position so well shown in FIGURE 3 of the appended drawing. The slide 18 embodies a top 19 and sides 20 and 21. The side 20 is provided with a circular opening for the reception of the already mentioned pin 17 while the side 21 is provided with a horizontally disposed ridge 22 on the inward and lower portion thereof for slidable projection in a horizontally disposed recess in the aforesaid side plate 14. Both the aforesaid ridge 22 and the recess in which it is normally located is U-shaped as viewed from the end.

The construction of this novel adjustable fishing float has now been described. Both the float 10 and all of its mechanisms may be made of any desired material. The float can, of course, be solid or hollow as desired. If hollow, the elongated recess 11 must be provided with "walls" in order to make the float a practical floatable object. The aforesaid pin 17 can, of course, be replaced with a screw if so desired in order to secure the inward end of the top 19 of the slide tight up against the fishing line 23 that passes vertically downward through the elongated recess 11 of the aforesaid fishing float 10 if it is so desired. The slide 18 is normally moved by one placing his fingers on the vertically disposed projections 24 of the aforesaid slide 18.

This novel adjustable fishing float I have invented can be used either stationary on the aforesaid fishing line 23 or it may be used for casting. In casting, the line 23 will run freely through the float 10 which line will now have a knot tied in the same above the float to stop the same at a desired depth.

From the foregoing it will now be seen that there is herein provided an Adjustable Fishing Float which accomplishes all of the objects of this invention, and others, including many advantages of great practical utility and commercial importance.

As many embodiments may be made of this inventive concept, and as many modifications may be made in the embodiment hereinbefore shown in described, it will be understood that all matter herein is to be interpreted merely as illustrative, and not in a limiting sense.

Having described my invention, what I claim, and desire to secure by Letters Patent is:

An adjustable fishing float of the character described, comprising a spherical fishing float body having an elongated recess therein and a pair of U-shaped structures secured to the said float, one structure being located at each end of the elongated opening and in line with the opening, and each said structure embodying a pair of spaced side plates secured together at one end by an end plate and a U-shaped slide adapted to slide over the ends and outer sides of the said side plates, and one of the said side plates having a transversely disposed elongated opening therein adapted to receive a pin projecting inwardly from one side of the said U-shaped slide and the other one of the said side plates having a horizontally disposed U-shaped recess therein adapted to receive a mating ridge on the lower inside of that side of the said U-shaped slide that is opposite the said pin and the said adjustable fishing float being adapted to receive a fishing line that normally passes through the elongated opening in the said float and in the U-shaped structures, the said line having its movement controlled by the said U-shaped slides.

References Cited by the Examiner

UNITED STATES PATENTS

| | | | |
|---|---|---|---|
| 1,149,033 | 8/15 | Davis | 43—44.92 |
| 1,213,645 | 1/17 | Holden | 24—263 |
| 2,503,793 | 4/50 | Breemes | 43—44.91 XR |
| 2,579,713 | 12/51 | Tolle | 43—44.91 |
| 2,683,325 | 7/54 | Sharp | 43—44.91 XR |
| 2,829,464 | 4/58 | Pettit et al. | 43—44.91 |

ABRAHAM G. STONE, *Primary Examiner.*

MELVIN D. REIN, *Examiner.*